United States Patent
Ramakrishna et al.

(10) Patent No.: US 7,688,805 B2
(45) Date of Patent: Mar. 30, 2010

(54) WEBSERVER WITH TELEPHONY HOSTING FUNCTION

(75) Inventors: Anand Ramakrishna, Redmond, WA (US); Anthony Bearon, Seattle, WA (US); David Simons, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1040 days.

(21) Appl. No.: 11/095,775

(22) Filed: Mar. 31, 2005

(65) Prior Publication Data

US 2006/0222166 A1 Oct. 5, 2006

(51) Int. Cl.
*H04L 12/66* (2006.01)

(52) U.S. Cl. ............... 370/352; 709/203; 709/208; 709/228; 709/243; 379/88.17; 379/88.18; 379/201.01

(58) Field of Classification Search ......... 370/351–356; 379/88.17–88.18, 201.01; 455/445, 453; 709/201–203, 208, 227–229, 239, 242–243
See application file for complete search history.

(56) References Cited

U.S. PATENT DOCUMENTS

| | | | | |
|---|---|---|---|---|
| 5,915,001 A * | 6/1999 | Uppaluru | ................ | 379/88.22 |
| 6,519,228 B1 * | 2/2003 | Creamer et al. | .......... | 379/15.01 |
| 7,170,863 B1 * | 1/2007 | Denman et al. | ............. | 370/260 |
| 7,221,945 B2 * | 5/2007 | Milford et al. | ........... | 455/452.1 |
| 7,308,484 B1 * | 12/2007 | Dodrill et al. | ................ | 709/218 |
| 2001/0036176 A1 * | 11/2001 | Girard | ........................ | 370/352 |
| 2002/0156900 A1 * | 10/2002 | Marquette et al. | ........... | 709/227 |
| 2003/0088421 A1 * | 5/2003 | Maes et al. | ............... | 704/270.1 |
| 2003/0233239 A1 * | 12/2003 | Creamer et al. | .......... | 704/270.1 |
| 2004/0071275 A1 * | 4/2004 | Bowater et al. | .......... | 379/88.18 |
| 2004/0111269 A1 * | 6/2004 | Koch | .......................... | 704/275 |
| 2004/0153497 A1 * | 8/2004 | Van Dyke et al. | ............ | 709/201 |
| 2004/0230659 A1 * | 11/2004 | Chase | ........................ | 709/206 |
| 2004/0246947 A1 * | 12/2004 | Wong | ........................ | 370/352 |

* cited by examiner

*Primary Examiner*—Fan Tsang
*Assistant Examiner*—Hemant Patel
(74) *Attorney, Agent, or Firm*—Westman, Champlin & Kelly, P.A.

(57) ABSTRACT

A telephony application host has a web service environment and a telephony application proxy. The web service environment is adapted to host one or more instances of a telephony application. The telephony application proxy is adapted to receive telephony messages associated with the one or more instances of the telephony application and to proxy each received telephony message into a web request. The telephony application is adapted to process the web request within the web service environment.

20 Claims, 6 Drawing Sheets

WEBSERVER WITH TELEPHONY HOSTING FUNCTION

BACKGROUND OF THE INVENTION

The present disclosure relates to hosting telephony applications, and more particularly, to hosting telephony applications in conjunction with web services.

Historically, telephony applications have been built and deployed around completely proprietary platforms and environments. These proprietary platforms lead to high costs in both development and maintenance of such applications due to a lack of standards and portability. Over the past several years, the growth of the World-Wide-Web has gradually been changing the landscape. Industry standards that marry the web with telephony environments have been introduced and telephony platforms implementing those standards have proliferated. However, even such platforms have a number of limitations.

Many of these platforms are distributed in nature, which result in added application development complexity. Most voice application developers build their applications based on software development kit controls, which abstract the underlying distributed model. However, such abstractions can be "leaky," meaning that features of the underlying model may inadvertently expose information and functional elements of the application. Moreover, the multiplicity of programming models leads to developer confusion.

In some telephony platforms, even web-based ones, developer code must be produced in a non-type-safe language, leading to error-prone code. Additionally, in some instances, the code must be consumed in source form and dynamically compiled as needed. This requires the developers to ship their software in source form, which potentially raises security as well as other issues such as intellectual property protection.

In some instances, the platform or server supports external communication only through form posts (such as HTML/HTTP). As a result, developers produce code to direct any communication between the platform and the web server through input and form elements. This type of communication is counterintuitive to many application developers. Moreover, given the variability of human speech, quantification of communications between the platforms and the web server via form elements may not function appropriately. Moreover, it may be difficult for traditional web servers to handle telephone calls, for example, because it is difficult for such servers to perform effective caching of the HTML across phone calls.

Therefore, there is an ongoing need for improvements in voice applications and Internet services.

SUMMARY OF THE INVENTION

A telephony application host has a web service environment and a telephony application proxy. The web service environment is adapted to host one or more instances of a telephony application. The telephony application proxy is adapted to receive incoming telephony messages over any telephony protocol associated with one or more instances of the telephony application.

In one embodiment, the telephony application proxy will activate the associated application instance running in the web service environment. The telephony application proxy can also play the role of a proxy between the telephony network and the telephony application running in the web service environment. Alternatively, the telephony application can directly communicate with the telephony environment after activation.

DETAILED DESCRIPTION OF ILLUSTRATIVE EMBODIMENTS

Figure 1:
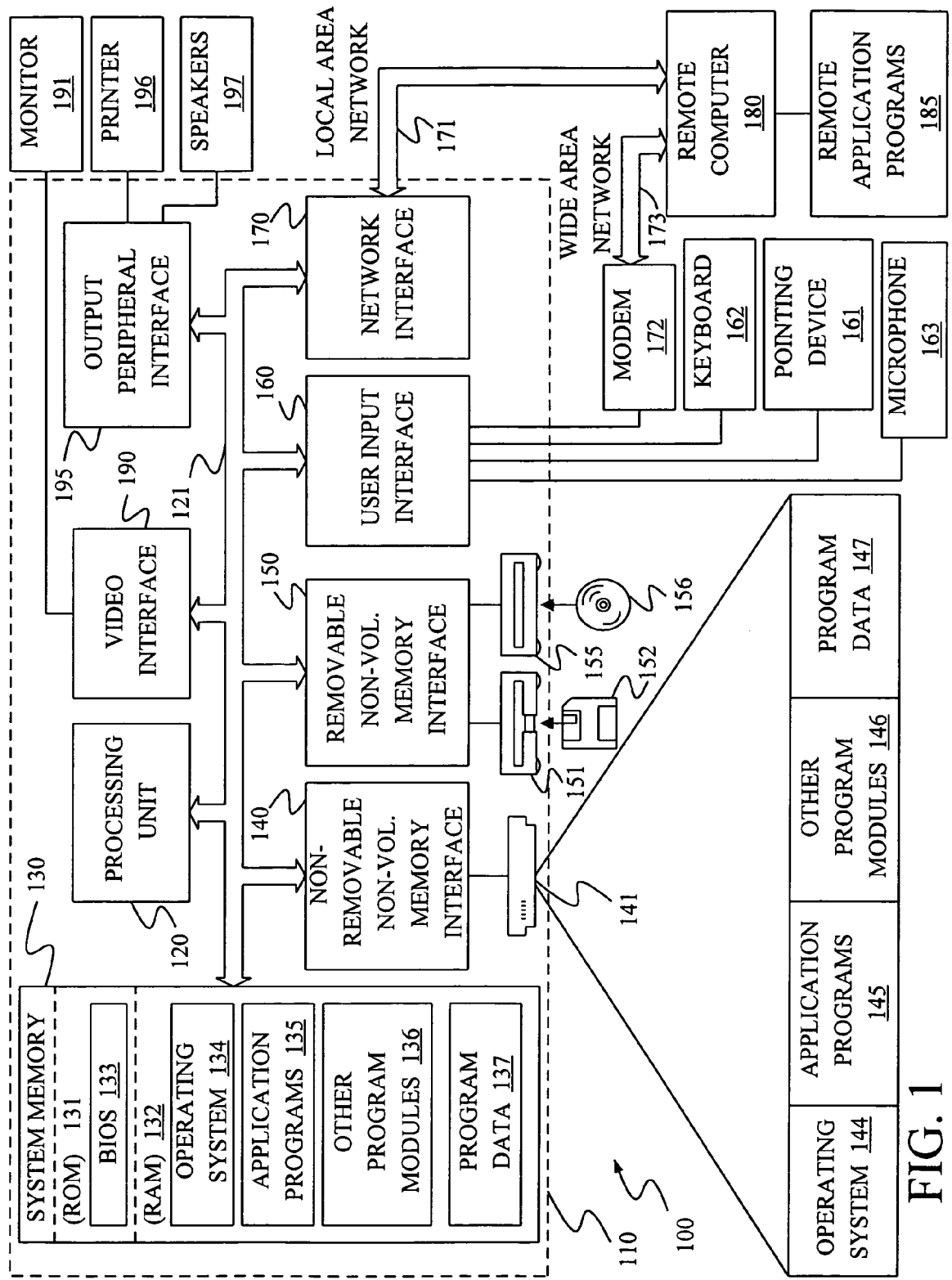
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, and the like, which perform particular tasks or which implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. The phrase "computer storage media" is intended to include volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage media, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention includes systems and methods that enable hosting of voice applications with web services. In one embodiment, the present invention relates to the concept of tying the hosting of speech (and specifically telephony) applications to Internet server (web/application server) services. Generally, the term "telephony" refers to the translation of sound to electrical signals and back to sound. As used herein, the term "telephony" refers to voice communications. More particularly, the term "telephony application" is used to refer to programs that control telephony devices and voice connections on a local computer (or local telephony device) and through servers. Telephony devices may include telephone handsets enabled for Voice over Internet Protocol (VoIP) communications, computers adapted with earphones and a microphone for voice communications, computers adapted with telephony hardware, or any other device adapted to facilitate voice communications. Voice communications may include person-to-person, person-to-device, or any other arrangement, including many-to-many (conferencing), and the like.

Figure 2:
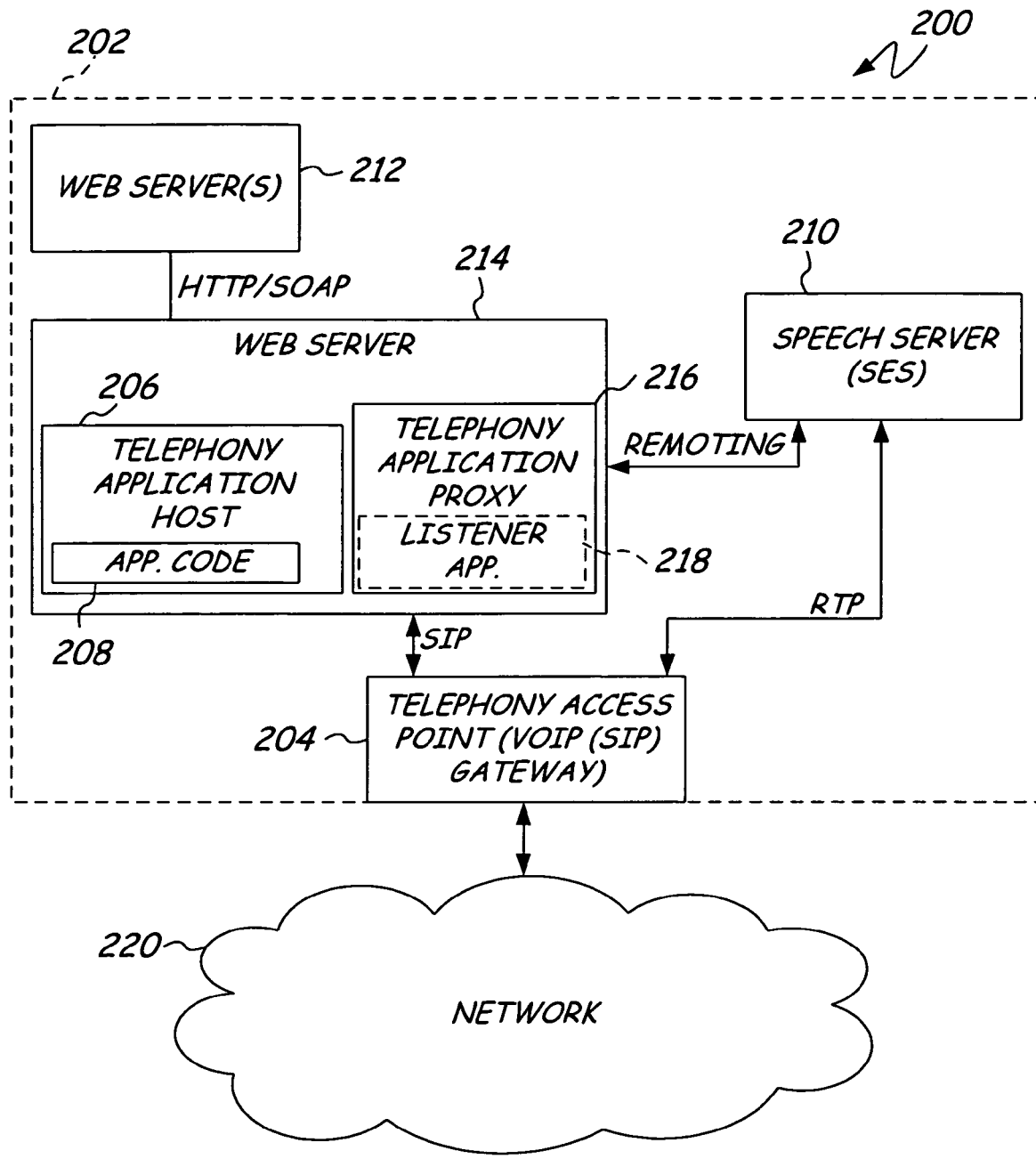
FIG. 2 is a simplified block diagram of a system for hosting telephony applications with a web server according to an embodiment of the present invention.

FIG. 2 is a simplified block diagram of the system 200 for hosting telephony applications in conjunction with web services according to an embodiment of the present invention. The system 200 includes an architecture 202, which is comprised of several elements. The architecture 202 includes a telephony access point or interface manager 204, a telephony application proxy 216, and a telephony application host 206 with application code 208, a speech server (SES) 210, and one or more web/application servers 212. The telephony application host 206 resides in a web/application server environment. The one or more web servers 210 are presented as part of the architecture 202 to illustrate support for n-tiered architectures. These web servers are optional.

In one embodiment, the telephony application proxy 216 is provided with a listener application 218 for handling outgoing calls. Specifically, the listener application 218 can be instantiated within the telephony application proxy 216 to facilitate outbound dialing by de-queuing elements from the listener application 218 and by making requests to the telephony application host 206 to activate the outbound application such as element 310B in FIG. 3). Once the outbound application is activated, the outbound application assumes responsibility for invoking functionality in the telephony framework to make the outbound call, such as communicating with a telephony access point 204 to establish a communications link. This allows the out-bound call to be activated as a web service. Finally, the architecture 202 is coupled to network 220 for sending and receiving telephony communications.

The telephony access point 204 is a tier in architecture 202 that may or may not be implemented or provided directly with the telephony application host 206. Generally, the telephony access point 204 is adapted to communicate externally with the network 220 and internally with the telephony application host 206. A variety of protocols may be used to perform this communication including SIP/RTP. Other telephony-based protocols may also be used.

The telephony application host 206 is where application code 208 resides and executes. The telephony application host 206 can be a typical application server in a web-based architecture. In one embodiment, the application server can provide or host an Internet Information Service (IIS) or Active Server Page (ASP) environment. The web/application server houses two components: a telephony application proxy 216 and a web service environment 214. The telephony application proxy 216 runs on the web/application server in its own process and is responsible for communicating with the telephony access point 204. The telephony application proxy 216 is responsible for supplying the well-known telephony end point to the telephony access point 204. If SIP is used as the telephony protocol, the telephony application proxy 216 provides a well-known SIP endpoint. Additionally, the telephony application proxy 216 converts ("proxies") the telephony protocol messages into http messages that the web service environment 214 can operate upon. The telephony application proxy 216 sends the call identification information as parameters with any Hypertext Transfer Protocol (HTTP) request that the telephony application proxy 216 issues. The web service environment 214 of the telephony application host 206 hosts and executes all application code 208. The telephony application defined by the application code 208 is offered as a web service inside the web service environment 214. All telephony interactions can be modeled as interaction with the web service environment 214. Instances of the telephony application can be activated ("instantiated") by the receipt of messages delivered over HTTP to the web service environment 214. Typically, the originator of the message is the telephony application proxy 216, which sends the message upon receipt of a telephony message denoting an incoming call. In the case of SIP, this message will be an INVITE.

Depending on the type of data received from network 220 by the telephony access point 204, the telephony access point 204 can communicate directly with speech server 210, which in turn can communicate with the telephony application host 206. Generally, the telephony application host 206 is adapted to communicate with the speech server 210 as need by a process referred to as "remoting", which means sending and receiving data over a socket connection.

Since the web service environment 214 is typically a stateless hosting environment, effort must be made to maintain a resident state of a number (n) of in-progress calls, which may be active at any given time across multiple HTTP-based requests. Managing the resident states within an otherwise stateless environment can be handled for multiple sessions, for multiple applications, and for multiple simultaneous users.

Implementation of the present invention provides seamless integration between the web application model and telephony applications. The present invention makes it possible to create a single application consisting of a set of assemblies that can service web user interface requests supplied through HTML/HTTP, web service requests supplied through SOAP/HTTP, and telephony service requests supplied through telephony protocols. The architecture of the present disclosure aligns speech server platforms to a great degree with web application models.

In most instances, voice applications may have fewer concurrent users by an order of magnitude as compared to concurrent users of web applications. Consequently, the scaling requirements can be much lower, resulting in far less complicated requirements for managing state overall. The telephony application host 206 manages states by ensuring that the same instance of the application is returned to manage multiple invocations of the web service.

Figure 3:
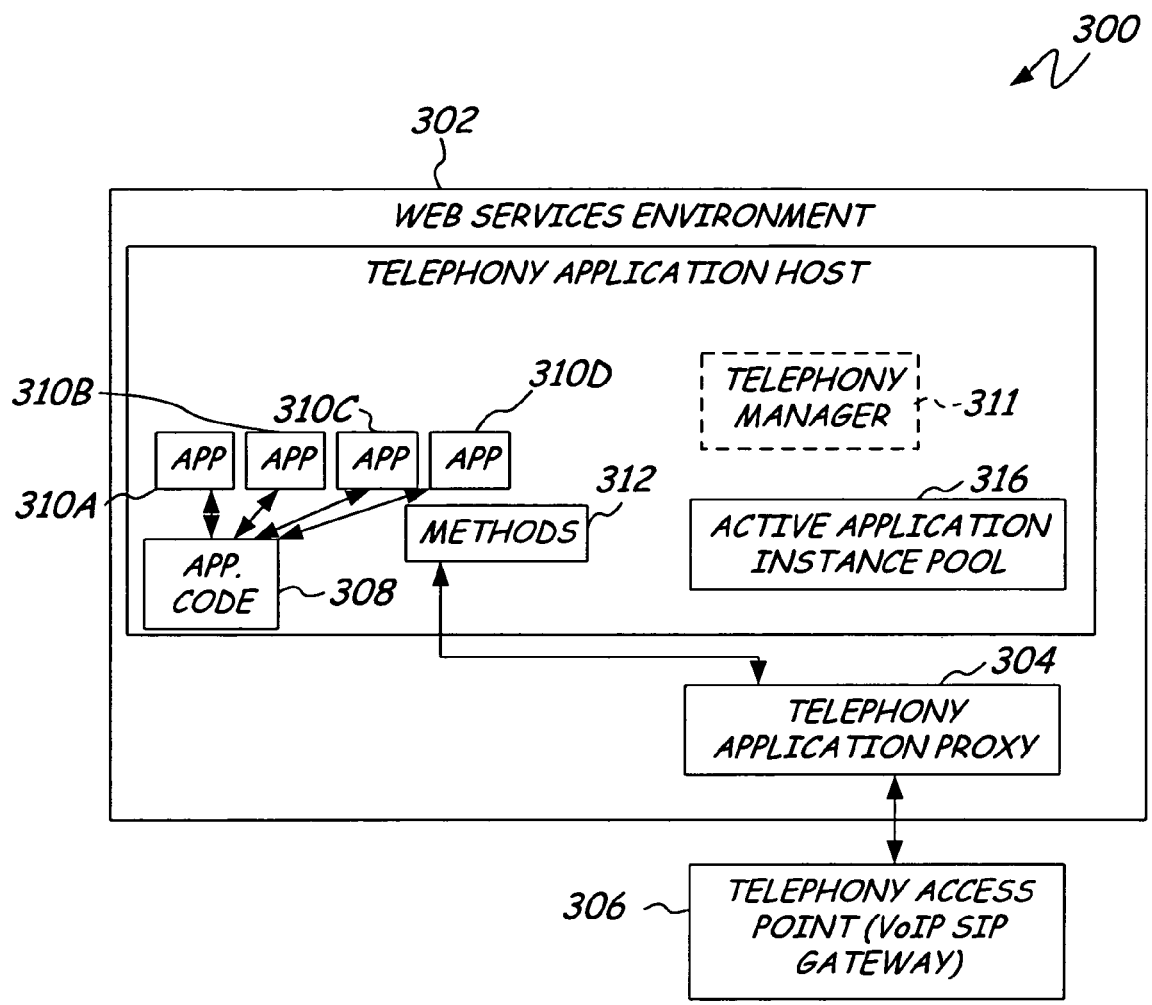
FIG. 3 is a simplified block diagram of a telephony application host according to an embodiment of the present invention.

FIG. 3 is a simplified block diagram of a telephony application host 300 according to an embodiment of the present invention. The telephony application host 300 resides in a web service environment 302. The telephony application proxy 304 is coupled to a telephony access point 306. The telephony application host 300 includes application code 308, which can be invoked to instantiate one or more instances of a telephony application 310A-310D within the web service environment 302. Any number of telephony applications 310 may be instantiated at any given time.

In general, the telephony manager 311 refers to a control element or feature adapted to manage interaction with instantiations of the voice application 310A-310D within the web services environment 302. The telephony manager 311 can be a separate element within the telephony application host 300 or can be implemented within the server code of the telephony application host 300, depending on the specific implementation.

The telephony application host 300 maintains a pool of active application instances 316, each of which is mapped with a unique call identifier to a particular application instance, such as 310A. Incoming web requests include the call identifier, and the telephony application host searches the active application instance pool 316 based on this identifier. The search returns the application instance 310A (for example) if the application instance 310A is found in the active application instance pool 316. If the instance 310A is not found, a new application instance 310A is created in the web environment 302 and is added to the active application instance pool 316.

The telephony application host is adapted to ensure that the same instance of an application is returned to service multiple requests. This gives developers the freedom to store the call state in a form of local variables and to ignore state management.

Figure 4:
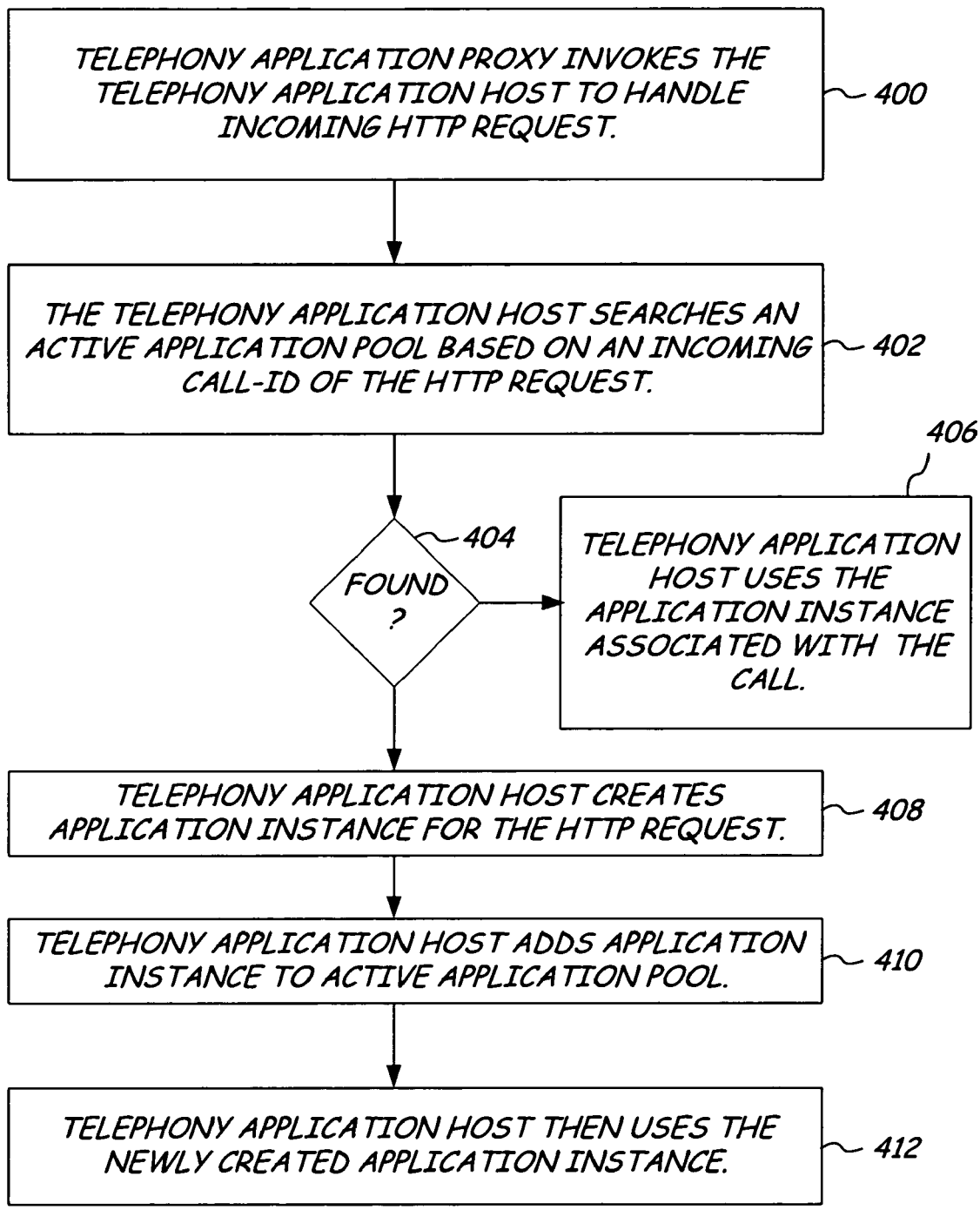
FIG. 4 is a simplified flow diagram of a method for managing in-progress calls within a stateless hosting environment according to an embodiment of the present invention.

FIG. 4 is a simplified flow diagram of a process for associating each received web request with associated application instance. As used herein, the term "web request" refers to any received request from an accepted transfer protocol, such as file transfer protocol (FTP), hypertext transfer protocol (HTTP), and the like. Other transfer protocols can also be used. The telephony application proxy receives an incoming HTTP request and invokes the telephony application host to handle the request (step 400). The telephony application host searches the active application pool based on the incoming call identifier in the HTTP request (step 402). If the application instance is found (step 404), the telephony application host uses an application instance associated with the call identifier (step 406).

If the application instance is not found (step 304), the telephony application host creates an application instance for the web request (step 408). The telephony application host adds the application instance to the active application pool (step 410). The telephony application host then uses the newly created application instance (step 412).

Figure 5:
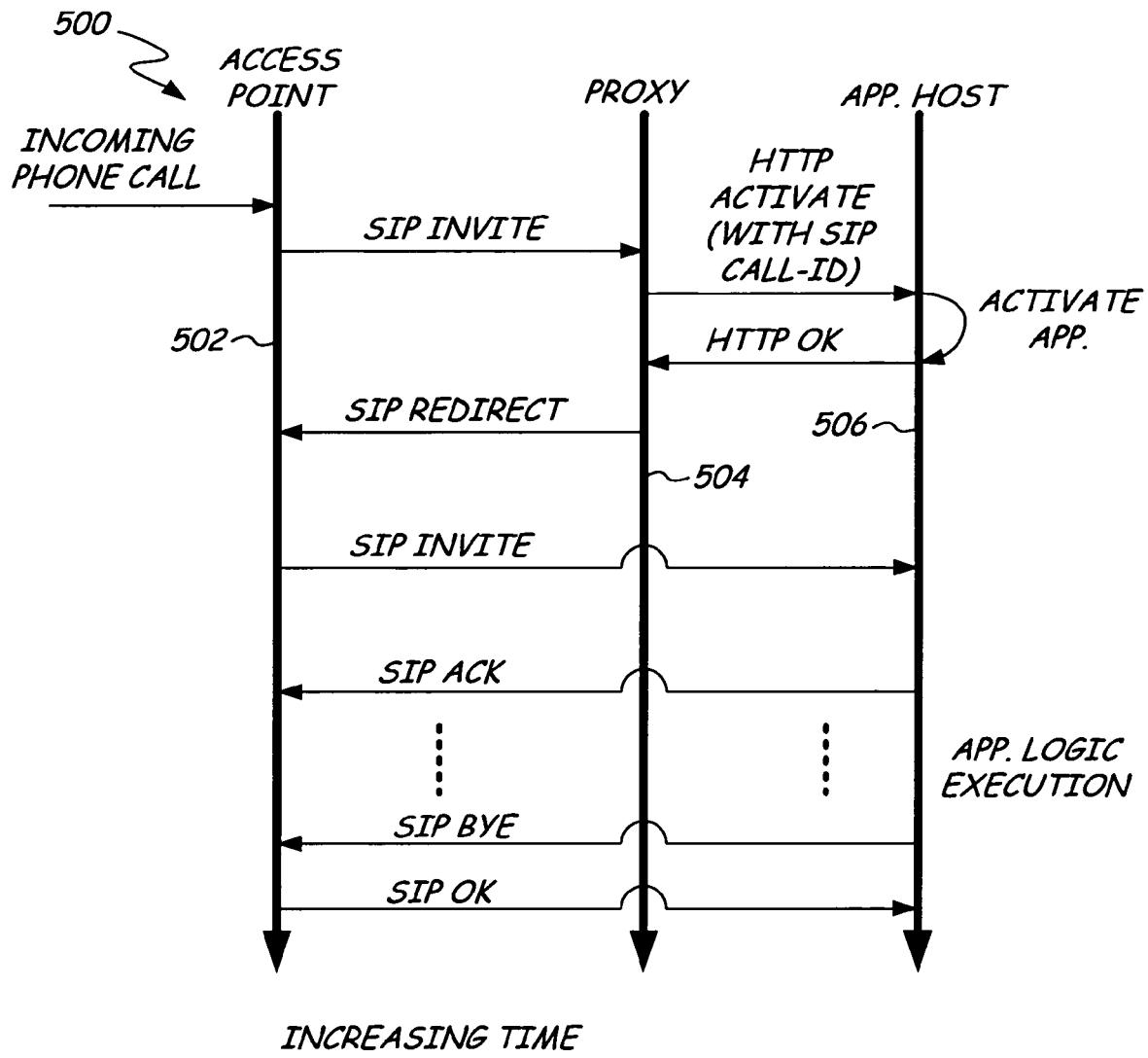
FIG. 5 is a simplified block diagram illustrating application activation and application hang-up according to an embodiment of the present invention.

FIG. 5 is a simplified timing diagram of an application activation and hang up scenario, where an inbound call initiates an interaction. This timing diagram is provided where the telephony signaling protocol is SIP. Other alternative telephony signaling protocols are also possible. The block diagram 500 includes an access point 502, a telephony application proxy 504, and an application host 506. The access point 502 (such as a VoIP gateway) receives an incoming voice phone call. The access point 502 transmits a SIP invite to the telephony application proxy 504. The proxy 504 translates the SIP invite into an HTTP message with a unique call identifier. The application telephony host 506 activates the application within the application host 506. The application is created (or instantiated) within the web service environment to handle the HTTP method. Once the application instance is successfully created, the application host acknowledges the activate request with an http okay response to the SIP proxy, which in turn sends a SIP re-direct to the telephony access point 502. The re-direct message informs the access point 502 to route all subsequent messages directly to the application in the application host 506. The activated application stays resident in memory because the telephony application host maintains a reference to the application while it is active.

The access point or gateway 502 resends the SIP invite to the application directly. The application responds by accepting the call with a SIP ACK message.

After application activation, application logic is executed within the application host. Once the logic execution is complete, the application can hang up on the caller by issuing an SIP BYE message to the access point 502 which drops the call and returns an SIP ACK response. On hang up, the application is marked by the application host 506 as being in a "hung up" state, and all resources used by the application are cleaned out. Additionally, the application instance is removed from the active application pool of the handler factory. The previous section details the application activation process when SIP is the telephony protocol. A very similar process is used when other telephony protocols are used, except instead of SIP messages the alternate equivalent telephony messages are sent.

Figure 6:
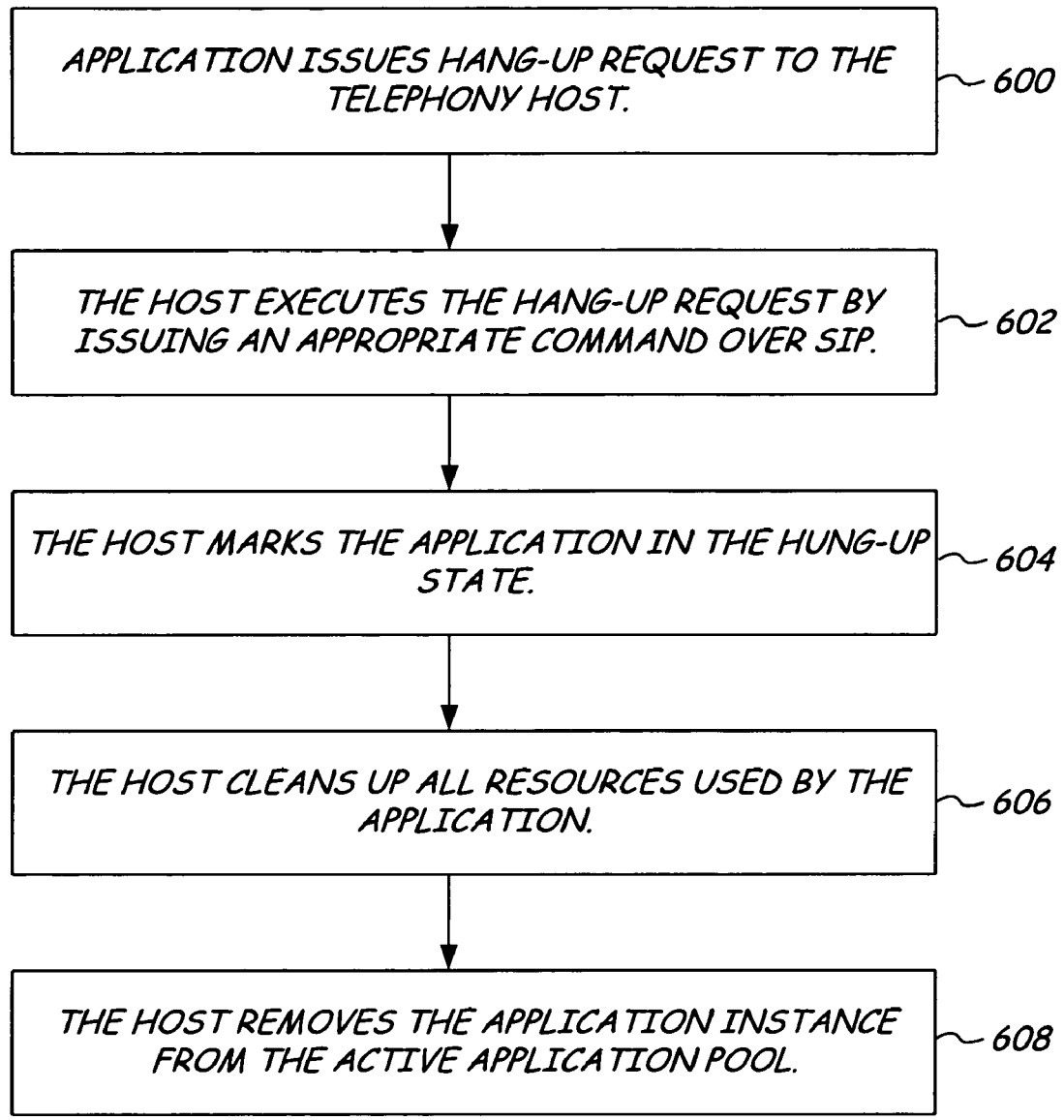
FIG. 6 is a simplified flow diagram of a process for application-initiated hang up according to an embodiment of the present invention.

FIG. 6 is a simplified flow diagram of a process for hanging up a call according to an embodiment of the present invention. The application hosted by the telephony application host in the web services environment issues a hang up request to the telephony application host (step 600). The telephony application host executes the hang up request by issuing the appropriate command over the telephony signaling protocol. In the case of SIP, this corresponds to a "BYE" command (step 602). The telephony application host marks the application in a hung-up (step 604). The telephony application host cleans up all resources used by the application (step 606). The telephony application host then removes the application instance from the active application pool (step 608). The application and its references are now free to be garbage collected appropriately.

The call session can also be terminated by user hang-up. This scenario is very similar to application hang-up scenario, except that the access point issues the appropriate hang-up telephony command. The application receives the hang-up message through the telephony application host and processes it appropriately (according to steps 602-608).

Although the present invention has been described with reference to particular embodiments, workers skilled in the art will recognize that changes may be made in form and detail without departing from the spirit and scope of the invention.

What is claimed is:

1. A telephony application host comprising:
   a memory;
   a processor communicatively coupled to the memory for executing instructions stored on the memory for implementing the following:
   a web service environment adapted to host one or more instances of a telephony application; and
   a telephony application proxy adapted to:
   receive telephony-related messages associated with the one or more instances of the telephony application;
   proxy a received telephony message into a web request to instantiate a particular instance of the telephony application;
   manage a call state by ensuring that the particular instance of the telephony application is associated with a particular call related to the received telephony message to manage multiple invocations of a web service throughout the particular call, the particular call comprising a communication session between a first user device and another user device; and
   instruct an access point associated with the particular call to route subsequent messages of the call directly to the particular instance of the telephony application.

2. The telephony application host of claim 1 further comprising:

computer readable application code stored in the memory of the telephony application host.

3. The telephony application host of claim 1 wherein the telephony application host comprises a web server.

4. The telephony application host of claim 1 wherein the telephony application proxy is coupled to the web service environment and adapted to associate each proxied web request with a selected instance of the one or more instances of the telephony application.

5. The telephony application host of claim 4 and further comprising:
a pool of active application instances representative of the one or more instances of the telephony application that are active in the web services environment.

6. The telephony application host of claim 5 wherein the telephony application host is adapted to interact with the pool of active application instances to return a unique instance of the active application corresponding to a specific request related to the received telephony message.

7. The telephony application host of claim 1 and further comprising:
a listener application instantiated within the telephony application proxy and adapted to make web requests into the telephony application host to activate an outbound call.

8. A method for managing telephony sessions comprising:
hosting one or more instances of a telephony application in a web service environment, the telephony application comprising a processor-executable set of instructions adapted to control telephony devices including telephone devices and computing devices adapted to voice communications, the telephony application to control voice connections via a web-based service, each of the one or more instances corresponds to an incoming call identifier;
receiving a first telephony message with a first call identifier from a first communication device to access a web service from a plurality of web services;
proxying the first telephony message into a first web-based message including the first call identifier to instantiate a first instance of a selected web-application associated with the web service in response to receiving the first telephony message;
sending a first re-direct message to a first access point associated with the first communication device to route all subsequent messages with the first call identifier to the first instance of the selected web application;
receiving a second telephony message with a second call identifier from a second communication device to access the web service;
proxying the second telephony message into a second web-based message including the second call identifier to instantiate a second instance of the selected web-application in response to receiving the second telephony message;
sending a second re-direct message to a second access point associated with the second communication device to route all subsequent messages with the second call identifier to the second instance of the selected web application; and
maintaining the first and second instances of the selected web-application for reuse with respect to the first and second communication devices to manage multiple invocations of the web service based on the first and second call identifiers;

wherein the first telephony message is related to a call between the first communication device and another user device.

9. The method of claim 8 and further comprising passing the web-based message to the web service environment.

10. The method of claim 8 wherein the step of hosting further comprises:
maintaining an active application instance pool comprising the first and second instances of the web-based application, each instance within the active application instance pool is associated with a respective call identifier.

11. The method of claim 10 wherein each invocation of the web service has an associated call identifier, the method further comprising:
searching the active application instance pool for the incoming call identifier that matches the associated call identifier of the invocation; and
returning the particular instance of the telephony application if a match is found.

12. The method of claim 10 wherein each invocation of the web service has an associated call identifier, the method further comprising:
searching the active application instance pool for the incoming call identifier that matches the associated call identifier of the invocation;
creating an application instance within the web service environment if a match is not found; and
adding the incoming call identifier of the created application instance to the active application instance pool.

13. The method of claim 8 wherein a state of each telephony session is managed via an active application instance pool based on the incoming call identifier.

14. A system for hosting telephone calls over a network, the system comprising:
a memory;
a processor coupled to the memory and for executing instructions stored on the memory for implementing the following:
a web server having a web service environment for hosting one or more web services;
a telephony application proxy adapted to communicate with a telephony access point and to proxy telephony messages from a communication device into web requests, each web request including call identification information associated with the communication device; and
a telephony application web service adapted to instantiate a telephony application to operate on the web requests within the web service environment in response to receiving a web request from the telephony application proxy;
wherein the telephone application proxy manages a call state between a first user device and another user device by utilizing the instantiated telephony application to service each of the web requests for the communication device throughout a particular call;
wherein the telephony application proxy is configured to transmit a re-direct message to an access point instructing the access point to route subsequent messages with the call identification information directly to the telephony application.

15. The system of claim 14 wherein an instance of the telephony application web service is associated with each in-coming call based on an unique call identifier.

16. The system of claim 15 wherein the call identification information comprises an unique number associated with the communication device.

17. The system of claim 14 further comprising:

a telephony application host adapted to receive the web requests and to associate each web request to a unique instance of the telephony application web service based on the call identification information contained within the web request.

18. The system of claim 17 further comprising:

an active application instance pool comprising an active list of unique instances of the telephony application web service, each unique instance having a unique identifier, wherein telephony application host interacts with the active application instance pool to associate each web request with its associated unique instance based on a correspondence between the call identification information and the unique identifier.

19. The system of claim 14 and further comprising:

a listener application instantiated within the telephony application proxy and adapted to make web requests into the web server to activate an outbound call.

20. The system of claim 14 further comprising:

computer readable application code stored in a memory of the system comprising a telephony application providing a particular web service.

\* \* \* \* \*

UNITED STATES PATENT AND TRADEMARK OFFICE
CERTIFICATE OF CORRECTION

| | | |
|---|---|---|
| PATENT NO. | : 7,688,805 B2 | Page 1 of 1 |
| APPLICATION NO. | : 11/095775 | |
| DATED | : March 30, 2010 | |
| INVENTOR(S) | : Anand Ramakrishna et al. | |

It is certified that error appears in the above-identified patent and that said Letters Patent is hereby corrected as shown below:

Title page, Item (75), under "Inventors" column 1, line 2, delete "Anthony Bearon" and insert -- Anthony John Bearon --, therefor.

Title page, Item (75), under "Inventors" column 1, line 3, delete "David Simons" and insert -- David James Simons --, therefor.

In column 5, line 34, before "such" insert -- ( --.

Signed and Sealed this
First Day of February, 2011

David J. Kappos
*Director of the United States Patent and Trademark Office*